April 28, 1953 — J. VAN TASSEL — 2,636,773
EXPANSIBLE TRAILER
Filed Dec. 16, 1949 — 3 Sheets-Sheet 1

INVENTOR.
James Van Tassel
BY Stedman B. Hoar
Agent

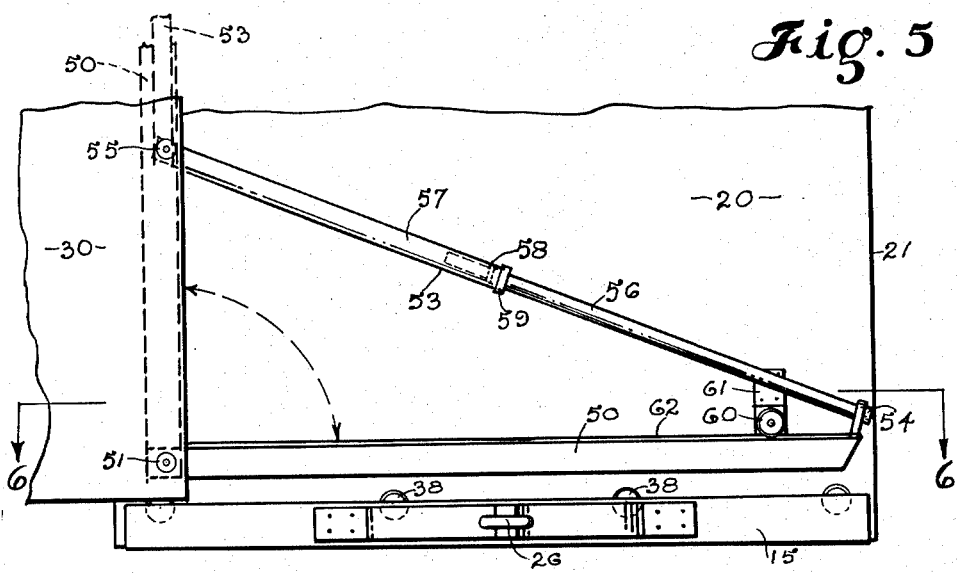
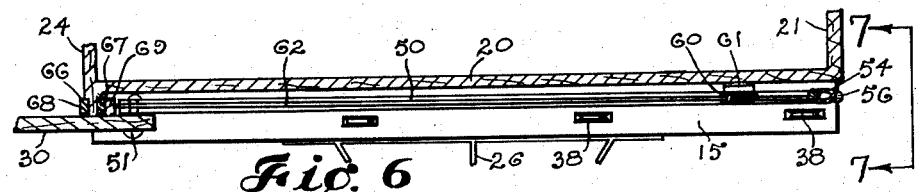
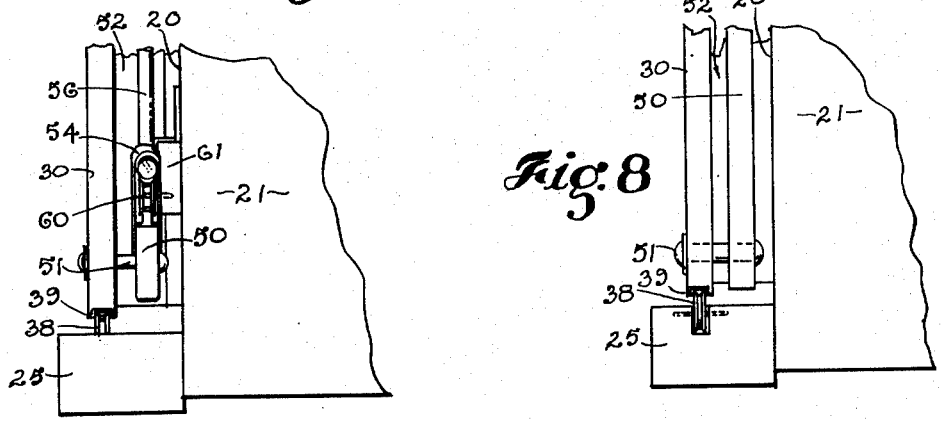
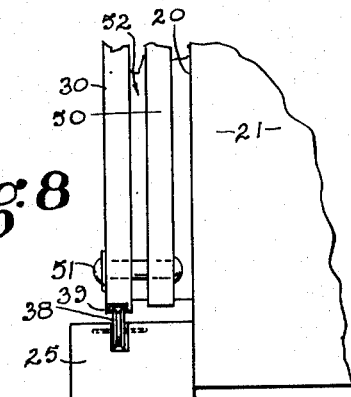

April 28, 1953     J. VAN TASSEL     2,636,773
EXPANSIBLE TRAILER

Filed Dec. 16, 1949     3 Sheets-Sheet 3

INVENTOR.
James Van Tassel
BY

Patented Apr. 28, 1953

2,636,773

UNITED STATES PATENT OFFICE 2,636,773

EXPANSIBLE TRAILER

James Van Tassel, Santa Ana, Calif., assignor, by mesne assignments, to Alert Development Corporation, a corporation of California Application December 16, 1949, Serial No. 133,293

10 Claims. (Cl. 296—23)

This invention relates to expansible vehicles, and particularly relates to automobile trailers of the house or camp type, intended to provide practicable living and storage accommodation when in road-travelling or compacted condition, but to be enlarged to provide more commodious quarters upon arrival at a camp site.

Numerous trailers have been designed, expansible for the above-stated purpose, but few have met with acceptance by the motoring public, chiefly for the reasons that they were either too loosely constructed to withstand road-travel or that they required excessive labor and skill to convert from one form to the other. A disadvantage common to many expansible trailers has been that the mechanism upon which the movable sections rolled or slid from one position to another and by which these sections were supported in their expanded positions, has been traditionally under the floor boards, where it accumulated dirt and was inaccessible for cleaning. Obviously, the hardened mixture of mud, dust, and oil, ordinarily to be found on the under-chassis of any vehicle, is not conducive to free operation of slides or rollers nor to the fitting of removable parts in sockets clogged by such a mixture. Neither is the prospect of having to clean beneath the floor boards upon arrival at a camp-site conducive to expansible trailer ownership.

It is accordingly an object of this invention to provide an expansible trailer in which the guiding and supporting mechanism for the movable portion of the trailer is disposed where it is less likely to accumulate dirt and where it is readily accessible for cleaning.

A further object of the invention is to provide an expansible trailer of simplified design and sturdy construction, convertible between compacted and expanded forms by simple operations requiring little time or skill and made practicable by the aforesaid dirt-free construction.

Still another object of the invention is to provide an expansible trailer in which the movable portion has a rigid construction of roof and walls, and in which the movable section is supported in expanded position by its walls, which must of necessity have inherent strength to withstand road-shock, rather than by under-floor bracing, thereby saving weight and duplication of costs.

It is a further object of the invention to provide an expansible trailer in which the rigid wall and roof structure of the movable section, and likewise the floor thereof, serve to strengthen and reinforce the structure of the stationary section, when in compacted road-travelling position, rather than merely being dependent thereon for support.

The invention possesses other objects and useful advantages which will be pointed out as the following description of a preferred embodiment of the invention proceeds, or will be apparent from that description in connection with the accompanying drawings, in which:

Figure 5 is an enlarged elevational detail view of the supporting mechanism shown in Figure 1;

Figure 6 is a horizontal sectional view of the supporting mechanism taken on the line of section 6—6 of Figure 5;

Figure 7 is a further enlarged fragmentary elevational view of the supporting mechanism, taken from the right of Figure 6 as indicated by the line 7—7 thereof;

Figure 8 is a view similar to Figure 7, but with the trailer compacted and the supporting mechanism folded in road-travelling position, as represented in Figure 3.

Figure 10:
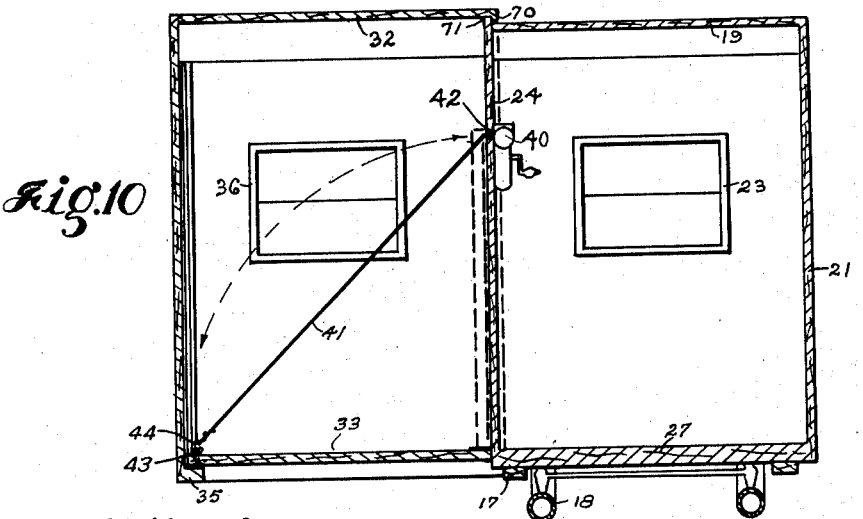
Figure 10 is a sectional view on the same plane of section as Figure 9, but showing the trailer expanded and the floor lowered.
Figure 11:
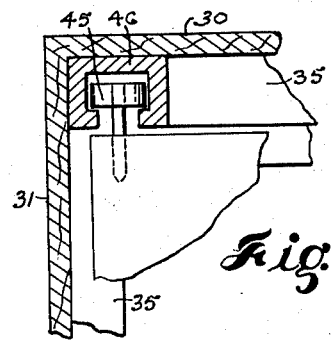
Figure 9:
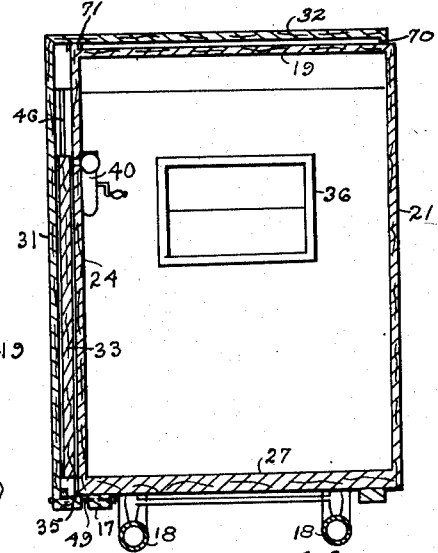
Figure 9 is a medial transverse vertical sectional view taken on the plane of section indicated by the line 9—9 of Figure 3, showing the floor of the movable trailer section raised to compacted position.
Figure 12:
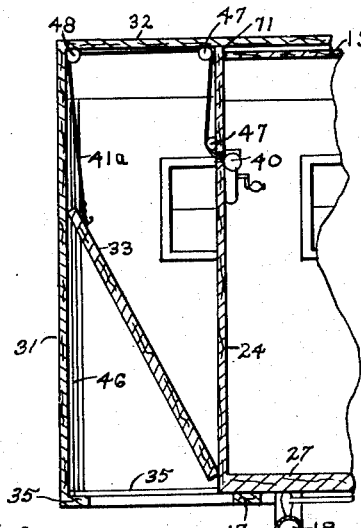

Figure 11 is an enlarged detail in plan of a corner of the movable section of the trailer, showing mechanism by which movement of the floor is utilized to cause telescopic movement of the movable trailer section; and Figure 12 is a fragmentary sectional view on the same planes as Figures 9 and 10, and showing the trailer partly telescoped, and also showing a modified form of mechanism for simultaneously moving the floor and telescoping the trailer.

Having reference now to the details of the drawings, my improved expansible trailer comprises a fixed housing body 15 and a movable housing body 16, the body 15 being built upon and fixed to a chassis frame 17 having wheels 18, and the body 16 being arranged as hereinafter set forth to have telescopic lateral movement relative to the body 15. The fixed body 15 has a roof 19 supported by end walls 20 and a side wall 21 which may be provided with doors 22 and windows 23 as may appear convenient. As shown in Figures 9, 10, and 12, there may be another side wall 24 opposite the wall 21, although as such a wall will serve only as an interior partition, it may consist only of suitable framework supporting interior panels and door-frames. The end walls 20 are spaced inwardly from the ends of the chassis 17 so as to leave exposed the end transverse chassis frame members 25. Suitable draw-bar means 26 are secured to one of the frame members 25. The door 27 of the fixed housing body may be supported by and secured to suitable chassis frame members 28, so as better to support heavy fixtures such as a stove, refrigerator, and sink (not shown) which will normally be carried in the fixed part of the trailer.

The movable housing body 16 has end walls 30, a side wall 31, and a roof 32 so proportioned in height and length that the walls 30 are outside of the end walls 20 of the fixed housing body when the two bodies are telescopically compacted, and the roof 32 is above the roof 19. A floor 33 is connected by hinges 34 to the fixed housing body 15 at the base of the wall 24, so that it may either be swung to a vertical position against the wall 24, when the trailer is compacted, or swung downward to serve as the floor for the movable housing body 16 when the trailer is expanded. Suitable sills 35 at the base of the walls 30 and 31 support the floor 33 in its lowered position. Windows 36 may be provided in walls 30, to align with windows 23 in the walls 20 when the trailer is compacted.

To facilitate movement of the movable housing body 16 relatively to the fixed housing body 15, the end transverse chassis frame members 25 are provided with rollers 38 upon which the end walls 20 may roll. The walls 20 are provided with grooves 39 on their lower margins, as tracks for the rollers 38. It will be observed (see Figures 5 to 8) that the rollers 38 are conveniently placed for lubrication and cleaning, being on the upper face of the chassis frame members 25, and that they are thus protected by the members 25 from direct splash of oil and mud normally incidental to road-travel.

Movement of the movable housing body 16 between its expanded and compacted positions, and lowering and raising of the floor 33, are accomplished simultaneously by mechanism now to be described. A winch 40 is mounted on the side wall 24 within the fixed housing body 15, for winding and releasing a wire cable 41 which extends through an opening 42 in the wall 24 to a ring-bolt 43 or other suitable fitting at the distal margin of the floor 33 to which it may be detachably secured by a hook 44 or the like. Mounted on the distal corners of the floor 33 are rollers 45, engaged in flanged channels 46 disposed vertically in the corners formed by the walls 30 and 31. When the winch 40 is operated to wind up the cable 41 and raise the floor 33, the rollers 45 pull inwardly upon the channels 46 in the manner of roller-cams and cause the movable housing body 16 to telescope upon the fixed housing body 15. Conversely, when the winch 40 is released, the weight of the floor 33 bearing against the channels 46 pushes the movable housing body 16 outwardly. When I refer hereafter to push-pull action, I refer to the pushing and pulling of the rollers 45 on the channels 46.

The cable 41 may be led directly from the winch 40 to the floor 33, as shown in Figure 10, in which case it may be detached from the fitting 43 and wound upon the winch when the trailer has been expanded until it is again required to raise the floor. Alternatively, a cable 41a may lead, as shown in Figure 12, around sheaves 47 on the wall 24 and thence to a sheave 48 on the wall 31 near the roof, and thence to the fitting 43. In the latter instance, the cable need not be detached, as it will traverse the movable housing body 16 above head-level, and it will exert a direct pull upon the wall 31 in addition to the pull of the rollers 45 upon the channels 46, when the cable is wound.

While the rollers 45 and channels 46 will hold the movable housing body 16 in the compacted position shown in Figure 9, they are not relied upon to do so during road-travel of the trailer. Bolts 49 may be used to secure the sill 35 at the base of the wall 31 to the chassis frame 17 underlying the wall 24. These bolts are readily accessible for loosening when the trailer is to be expanded.

During movement of the movable housing body 16 to and from its expanded position, the body 16 is balanced by cantilever action of the truss mechanism shown in Figures 5 to 8. Lever bars 50 are pivotally secured by bolts 51 to the inner sides of the end walls 30 adjacent the free margins thereof so that the bars 50 may be swung upward into pockets 52 formed between the walls 30 and the walls 20 when the trailer is compacted or may be swung downwardly to horizontal positions. The bars 50 are limited in their downward swing to horizontal positions by linkages 53 pivotally secured to lugs 54 at the distal ends of the bars 50 and by bolts 55 to the walls 30 at substantial heights above the bolts 51, so that the bars 50, linkages 53, and walls 30 form triangular trusses adapted to keep the walls 30 from sagging when the bars 50 are held horizontally. The linkages 53 may be simply jointed and folding bars, but to save space in the pockets 52 a telescopic construction is preferred in which a rod 56 slides within a tube 57 and is prevented from separating from the tube by a collar 58 on the rod engaging a cap 59 on the tube.

To exert cantilever force upon the bars 50, wheels 60 are mounted on the outside of the end walls 20 of the fixed housing body 15, being offset from the walls by blocks 61 so as to run on ridges 62 on the upper sides of the bars 50. The wheels 60 are disposed sufficiently inwardly from the side wall 21 so that the pivot bolts 51 pass beyond the wheels 60 when the trailer is compacted as shown in Figure 2, the bars 50 then being free of restraint by the wheels 60 and being capable of being folded into the pockets 52 or of being extended horizontally.

With the above-described cantilever trusses acting on the end walls 30 to hold the walls from sagging as they receive less or more support from the rollers 38, the corner frame structure of the movable housing body 16 may advantageously be used both to supply strength to the walls and to sustain weatherstripping for the whole structure. Figure 6 is in part illustrative of such frame structure. Upright framing pieces 66, attached to the outside of the corners formed by the wall 20 and 24 may be provided with weatherstrips or gaskets 67 and 68. Upright frame members 69, strengthening the free ends of the walls 30, will seal against the gaskets 67 when the trailer is extended, and the channels 46 at the other ends of the wall 30 will seal against the gaskets 68 when the trailer is compacted. End rafters 70 under the roof 32 will seal against a raised member 71, reinforcing the roof 19 above the partly cut-away wall 24. The outside side wall 31 may be held to moderate weight and strength, to reduce the unbalancing force upon the expanded trailer, as this wall will bear little stress in the expanded position and will be supplemented as an outside wall in the compacted position by the raised floor 33 and the interior wall 24.

Figure 1:
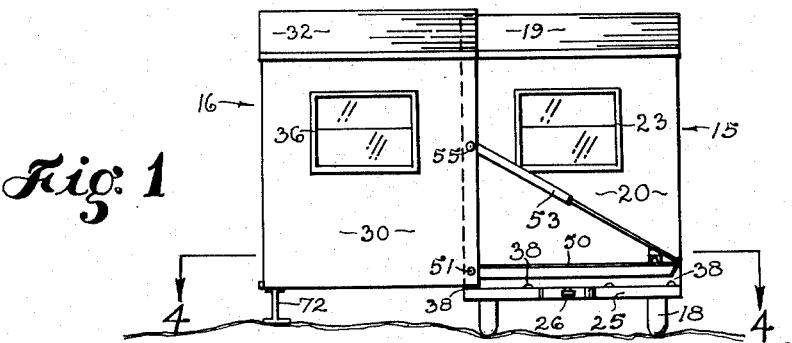
Figure 1 is an end elevational view of a trailer embodying the principles of the present invention, showing the trailer expanded.
Figures 2, 3:
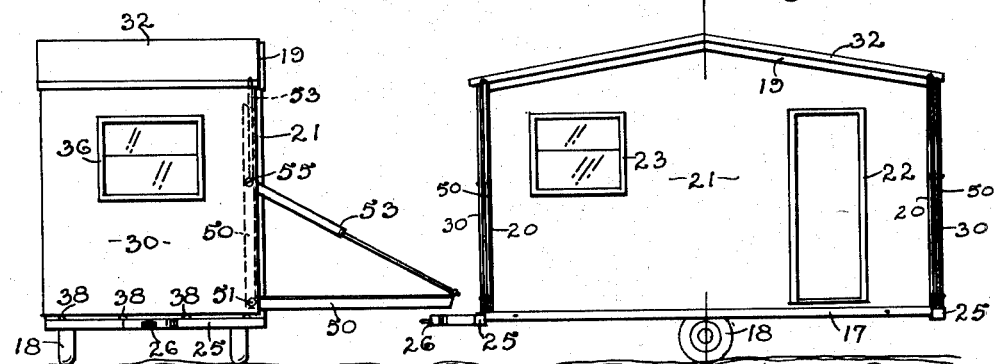
Figure 2 is another end elevational view, showing the same trailer compacted, and with the supporting mechanism for the movable section of the trailer shown extended and ready to support said section, and also, in broken lines, folded in road-travelling position.
Figure 3 is a side elevational view of the trailer in its compacted form, taken from the right of Figure 2, and showing the supporting mechanism folded into road-travelling position.
Figure 4:
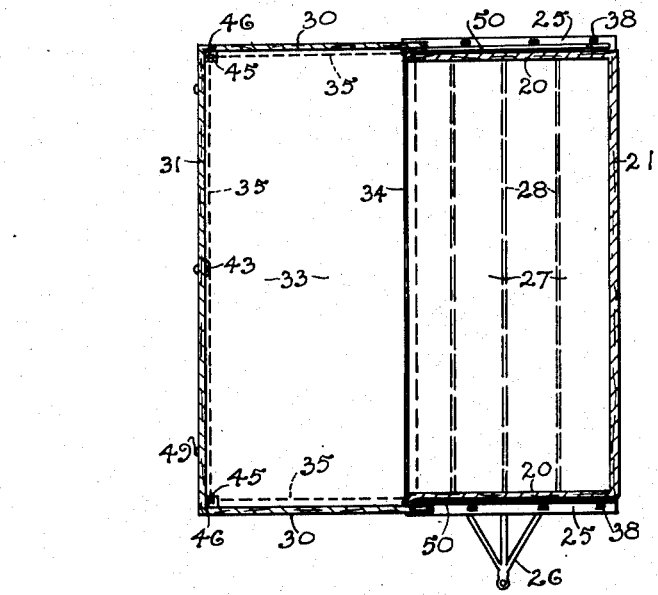
Figure 4 is a floor plan view of the expanded trailer, the plane of section being approximately indicated by the line 4—4 of Figure 1.

To expand the trailer from a compact vehicle to a dwelling having approximately twice the floor space of the vehicle, the bolts 49 are removed to permit relative movement of the housing bodies, and the lever bars 50 are swung down to their horizontal positions as shown in Figure 2. The winch 40 is then released to permit unwinding of the cable 41, which will have been left attached to the ring-fitting 42 during road-travel of the vehicle. A slight push on the floor 33 may be required to give the floor an inclination from the vertical, after which the weight of the floor acting through the rollers 45 upon the channels 46 will cause the movable housing body 16 to roll outwardly upon the rollers 38. When the floor 33 comes to rest upon the sills 35, the expansion of the trailer is completed. During this expansion movement, no counterbalancing or propping of the movable body 16 is required, other than that provided by the cantilever trusses, as the weight of the chassis 17, the fixed body 15 and the fixtures and furniture contained therein will more than counterbalance the movable body 16. Before furniture is moved into the movable body 16, jacks 72 may be placed beneath the sills 35, and it will be noted that no preliminary levelling of the ground beneath the movable body 16 is required, and that there are no extended support bars or tracks requiring levelling or alignment.

To return the vehicle to its compacted form, any furniture in the movable body 16 is moved to the fixed body 15, the jacks 72 are removed, the cable 41 is attached to the ring fitting 42 (if the cable 41a is used, it may be permanently attached) the winch 40 is operated to raise the floor and pull the movable body inwardly, the bolts 49 are replaced, and the bars 50 and linkages 53 are folded into the pockets 52.

Obviously, numerous changes in design and construction are possible in the trailer here shown and described by way of example, without departing from the spirit and scope of my invention, which I wish to have interpreted as set forth in the appended claims.

I claim:
1. In a vehicle of the character described: a fixed housing body, including end walls; a movable housing body adapted for telescopic movement relative to said fixed housing body and having end walls arranged to envelop exteriorly the end walls of said fixed housing body; co-operating guide means on said fixed housing body and on the end walls of said movable housing body for guiding said movable housing body in said telescopic movement; means on said movable housing body extensible therefrom exteriorly of the end walls of said fixed housing body; means for securing said extensible means rigidly in their extended positions; roller means on said fixed housing body engaging said extensible means when the latter are extended for exerting cantilever action thereon to support said movable housing body; a floor for said movable housing body hinged to said fixed housing body; means for moving said floor between vertical and horizontal positions; and means carried by said movable housing body and by said floor for automatically moving said movable housing body to compacted relation with said fixed housing body as said floor is raised and moving it to extended relation as said floor is lowered.

2. In a vehicle of the character described: a fixed housing body; a horizontally movable housing body telescopically arranged in relation to said fixed housing body; a floor for said movable housing body hingedly conected at one edge to said fixed housing body; means for raising and lowering said floor; vertical track means on said movable housing body extending upwardly from the distal edge of said floor; and means on said floor slidably engaging said track means so as to exert a push-pull thereon for causing inward and outward movement of said movable housing body in response, respectively, to upward and downward arcuate movement of said floor.

3. In a vehicle of the character described: a fixed housing body; a movable housing body telescopically arranged in relation to said fixed housing body; a floor for said movable housing body hingedly connected to said fixed housing body; means for raising and lowering said floor; vertical channels on said movable housing body; and rollers mounted marginally on said floor and engaging said channels to exert an outward push thereon when said floor is lowered and an inward pull thereon when said floor is raised.

4. In a vehicle of the character described: a fixed housing body; a movable housing body open at one side and at the bottom and arranged to envelop three sides and the roof of said fixed housing body when in a telescopically compacted relation thereto; a floor for said movable housing body hinged to said fixed housing body; support means for the free margins of said floor on the walls of said movable housing body; and support means for the walls of said movable housing body when in telescopically extended relation to said fixed housing body inclusive of trusses connecting said walls at levels above said floor to corresponding ends of said fixed housing body.

5. In a vehicle of the character described: a fixed housing body inclusive of a chassis and having end walls disposed inwardly from the ends of said chassis; a movable housing body arranged for telescopic movement relative to said fixed housing body and having end walls disposed to envelop exteriorly the end walls of said fixed housing body; means adjacent the ends of said chassis for supporting the end walls of said movable housing body during telescopic movement thereof; levers respective to the end walls of said movable housing body and pivotally connected to said walls for movement between vertical positions and horizontal positions in which they are in parallel extension of said walls; means for limiting downward movement of said levers to movement to said horizontal positions; and rollers mounted on said fixed housing body engageable with the upper sides of said levers when the latter are in said horizontal positions, whereby said movable housing body is further supported by cantilever action of said levers and said rollers when in extended position.

6. In a vehicle of the character described, the construction set forth in claim 5, in which the end walls of said housing body are spaced to form laterally opening pockets when in compacted position, and said levers are foldable into said pockets.

7. In a vehicle of the character described, the construction set forth in claim 5 in which said means for holding said levers rigidly comprise linkage means pivotally secured to the end walls of said movable housing body at substantially elevated positions so as to form with said levers and said walls trusses for the support of said movable housing body.

8. An expansible trailer comprising: a fixed body; a movable body having end walls, a side wall, and a roof movable telescopically relative to said fixed body, said movable body being supported relatively to said fixed body by said end walls; a floor for said movable body hinged to said fixed body for vertical swinging movement and having its distal edge normally disposed at the foot of said side wall; and cable means for simultaneously pulling said movable body inwardly toward said fixed body and swinging said floor upwardly; said cable means extending from said fixed body to a position on said movable body above said normal position of the distal edge of said floor and thence to said distal edge, whereby release of said cable means permits said floor to incline from a raised position toward said side wall.

9. In a vehicle having a fixed body, a body movable telescopically with respect to said fixed body, and a floor for said movable body having vertical arcuate movement about an edge of said floor transverse to the telescopic movement of said movable body: means for raising and lowering said floor arcuately; vertical tracks on said movable body adjacent the distal edge of said floor; and means on said floor adjacent the distal edge thereof and engaging said tracks so as to exert a push-pull force thereon for converting upward and downward arcuate movement of said floor respectively into inward and outward telescopic movement of said movable body.

10. In a vehicle having a fixed body, a body movable telescopically with respect to said fixed body and a floor for said movable body having vertical arcuate movement about an edge of said floor transverse to the telescopic movement of said movable body: a cable connected both to said movable body and to the distal edge of said floor and having one end connected to said fixed body, so as when tensed to exert simultaneously an inward pull on said movable body and an upward pull on the distal edge of said floor; means for tensing and releasing said cable; and means on the distal edge of said floor slidably engaging a vertical portion of said vehicle whereby said floor by arcuate downward movement may exert a push on said vertical portion.

JAMES VAN TASSEL.

References Cited in the file of this patent

UNITED STATES PATENTS

| Number | Name | Date |
|---|---|---|
| 690,306 | Leppert | Dec. 31, 1901 |
| 2,368,936 | McGehee | Feb. 6, 1945 |

FOREIGN PATENTS

| Number | Country | Date |
|---|---|---|
| 53,167 | Germany | Aug. 13, 1890 |
| 329,088 | Great Britain | May 15, 1930 |